(12) United States Patent
Brunetti

(10) Patent No.: US 11,174,012 B2
(45) Date of Patent: Nov. 16, 2021

(54) ROTOR FOR AN AIRCRAFT CAPABLE OF HOVERING AND RELATIVE METHOD

(71) Applicant: LEONARDO S.P.A., Rome (IT)

(72) Inventor: Massimo Brunetti, Samarate (IT)

(73) Assignee: LEONARDO S.P.A., Rome (IT)

( * ) Notice: Subject to any disclaimer, the term of this patent is extended or adjusted under 35 U.S.C. 154(b) by 393 days.

(21) Appl. No.: 16/473,672

(22) PCT Filed: Dec. 29, 2017

(86) PCT No.: PCT/EP2017/084806
§ 371 (c)(1),
(2) Date: Jun. 26, 2019

(87) PCT Pub. No.: WO2018/122371
PCT Pub. Date: Jul. 5, 2018

(65) Prior Publication Data
US 2019/0329876 A1 Oct. 31, 2019

(30) Foreign Application Priority Data

Dec. 30, 2016 (EP) ..................................... 16207538

(51) Int. Cl.
*B64C 27/12* (2006.01)
*B64C 27/68* (2006.01)
*H02K 16/02* (2006.01)

(52) U.S. Cl.
CPC .............. *B64C 27/12* (2013.01); *B64C 27/68* (2013.01); *H02K 16/02* (2013.01); *B64C 2201/042* (2013.01)

(58) Field of Classification Search
CPC ........ B64C 27/12; B64C 27/68; H02K 16/02; H02K 16/025
See application file for complete search history.

(56) References Cited

U.S. PATENT DOCUMENTS 2,838,123 A * 6/1958 Olcott .................... B64C 27/12
244/17.19
5,704,567 A * 1/1998 Maglieri ................ B64D 15/12
244/134 D (Continued)

OTHER PUBLICATIONS

International Search Report and Written Opinion in corresponding International Patent Application No. PCT/EP2017/084806 dated Mar. 20, 2018. 12 pages.

*Primary Examiner* — Marc Burgess
(74) *Attorney, Agent, or Firm* — Leason Ellis LLP

(57) ABSTRACT

There is disclosed a rotor for an aircraft capable of hovering, comprising: a stator; a rotatable element, which is rotatable about an axis with respect to stator; a blade, which is connected with element; a support element, which supports a source of a magnetic field and is either stationary or driven in rotation at a first rotational speed; and a first electric circuit, which is angularly integral with element and can be driven in rotation at a second rotational speed different from first rotational speed; first electric circuit being electromagnetically coupled with source so that an electromotive force is magnetically induced in first electric circuit and an first electric current flows in first electric circuit; rotor further comprises a second electric circuit which is either stationary or driven in rotation at a first rotational speed, and a sensor generating a signal associated to a back electromotive force induced on second electric circuit.

15 Claims, 9 Drawing Sheets

(56) References Cited

U.S. PATENT DOCUMENTS

| | | | |
|---|---|---|---|
| 8,851,415 B1 | 10/2014 | Lugg | |
| 2009/0269199 A1* | 10/2009 | Rudley | B64C 27/72 |
| | | | 416/113 |
| 2010/0021295 A1* | 1/2010 | Perkinson | B64C 11/06 |
| | | | 416/1 |
| 2012/0299428 A1 | 11/2012 | Doyle et al. | |
| 2013/0228654 A1* | 9/2013 | Aubert | B64D 15/12 |
| | | | 244/134 D |
| 2014/0248168 A1 | 9/2014 | Chantriaux et al. | |
| 2014/0312722 A1* | 10/2014 | Raad | H02K 7/006 |
| | | | 310/52 |
| 2016/0329777 A1 | 11/2016 | Mariotto | |

\* cited by examiner

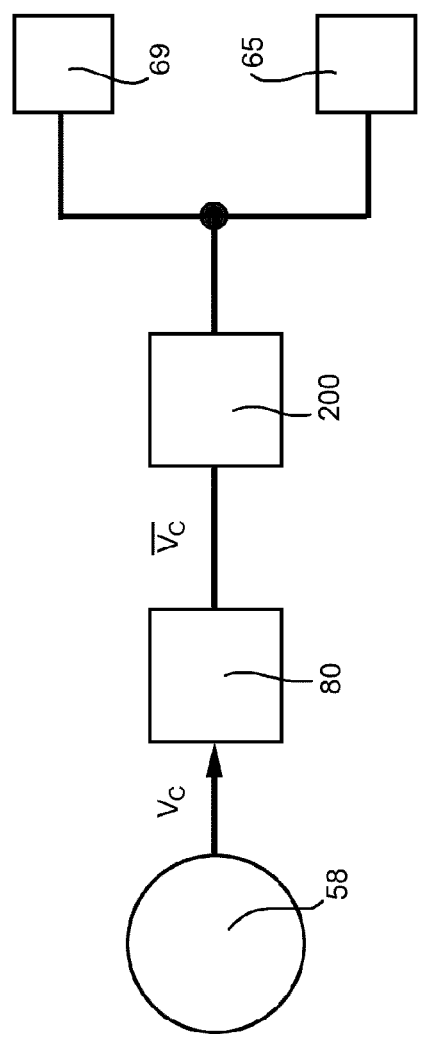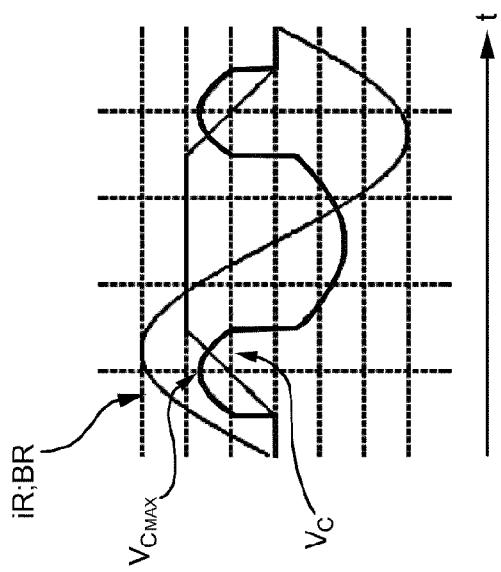

US 11,174,012 B2

ROTOR FOR AN AIRCRAFT CAPABLE OF HOVERING AND RELATIVE METHOD

CROSS-REFERENCE TO RELATED PATENT APPLICATIONS

This application is a U.S. National Phase Application under 35 U.S.C. § 371 of International Patent Application No. PCT/EP2017/084806, filed Dec. 29, 2017, which claims priority from European Patent Application No. 16207538.6 filed on Dec. 30, 2016, the disclosure of which is incorporated by reference.

TECHNICAL FIELD

The present invention relates to a rotor for an aircraft capable of hovering, in particular a helicopter or a convertiplane. The present invention also relates to a method of operating a rotor for an aircraft capable of hovering, in particular a helicopter or a convertiplane.

BACKGROUND ART

Known helicopters comprise a fuselage, a main rotor upwardly protruding from the fuselage and a tail rotor which is arranged at a tail of the fuselage. Furthermore, known helicopters comprise a turbine, a main transmission group which transmits the motion from the turbine to the main rotor, and an additional transmission group which transmits the motion from the main transmission group to the tail rotor.

Main rotor and tail rotor comprise, each:
  a stationary case;
  a mast which is driven in rotation by the main or the additional transmission group about its own axis;
  a hub driven in rotation by the mast; and
  a plurality of blades which are articulated with respect to the hub.

A need is felt in the art to provide the rotating components of the main and tail rotor, i.e. the mast, the hub and the blades, with electric power. For example, the electric power can be used for activating a de-icing or anti-icing system formed by a plurality of electric conductors embedded in the blades and adapted to heat the relative blades by Joule effect or for activating some movable surfaces on the blades. In order to provide the rotating components of the main rotor with the required electric power, known helicopters normally comprise an electric generator operated by a shaft electrically connected to the main transmission group and a slip-ring. The slip-ring transmits the electric power by creating a rubbing contact from the stationary conductors electrically connected to the generator to the rotating conductors of the main or tail rotor. Even if well performing, the previously described solutions leave room for improvements. As a matter of fact, the slip-ring is complex to manufacture and maintain, and is easily subjected to wear effect. This drawback is exacerbated especially in anti-torque tail rotors, which rotate at higher speed than main rotor. A need is therefore felt within the industry to transmit the electric power to the rotating parts of the main or tail rotor, while eliminating the aforesaid drawbacks in a straightforward, low-cost manner. Still more precisely, a need is felt to monitor the operative status of the accessory components for reasons of safety, while avoiding the previously identified drawback. For example, a need is felt to monitor whether or not they are electrically fed, the level of electric energy with which they are fed, the presence of short-circuits.

US 2016/0329777, US 2014/248168; US-B-8,851,415; and US-A-2012/229428 disclose known rotor solutions.

DISCLOSURE OF INVENTION

It is an object of the present invention to provide a rotor for an aircraft capable of hovering, which meets at least one of the above requirements.

The aforementioned object is achieved by the present invention as it relates to a rotor for an aircraft capable of hovering, as claimed in claim 1.

The invention also relates to a method for operating a rotor for an aircraft capable of hovering, as claimed in claim 14.

BRIEF DESCRIPTION OF THE DRAWINGS

Five preferred embodiments are hereinafter disclosed for a better understanding of the present invention, by way of non-limitative example and with reference to the accompanying drawings, in which:

FIG. 8 is a schematic view of an additional electrical circuit of the rotor of FIGS. 1 to 7;

FIG. 9 is a graphical plot of some electric quantities of the electric circuits of the rotor of FIGS. 1 to 7 with respect to time.

BEST MODE FOR CARRYING OUT THE INVENTION

Figure 1:
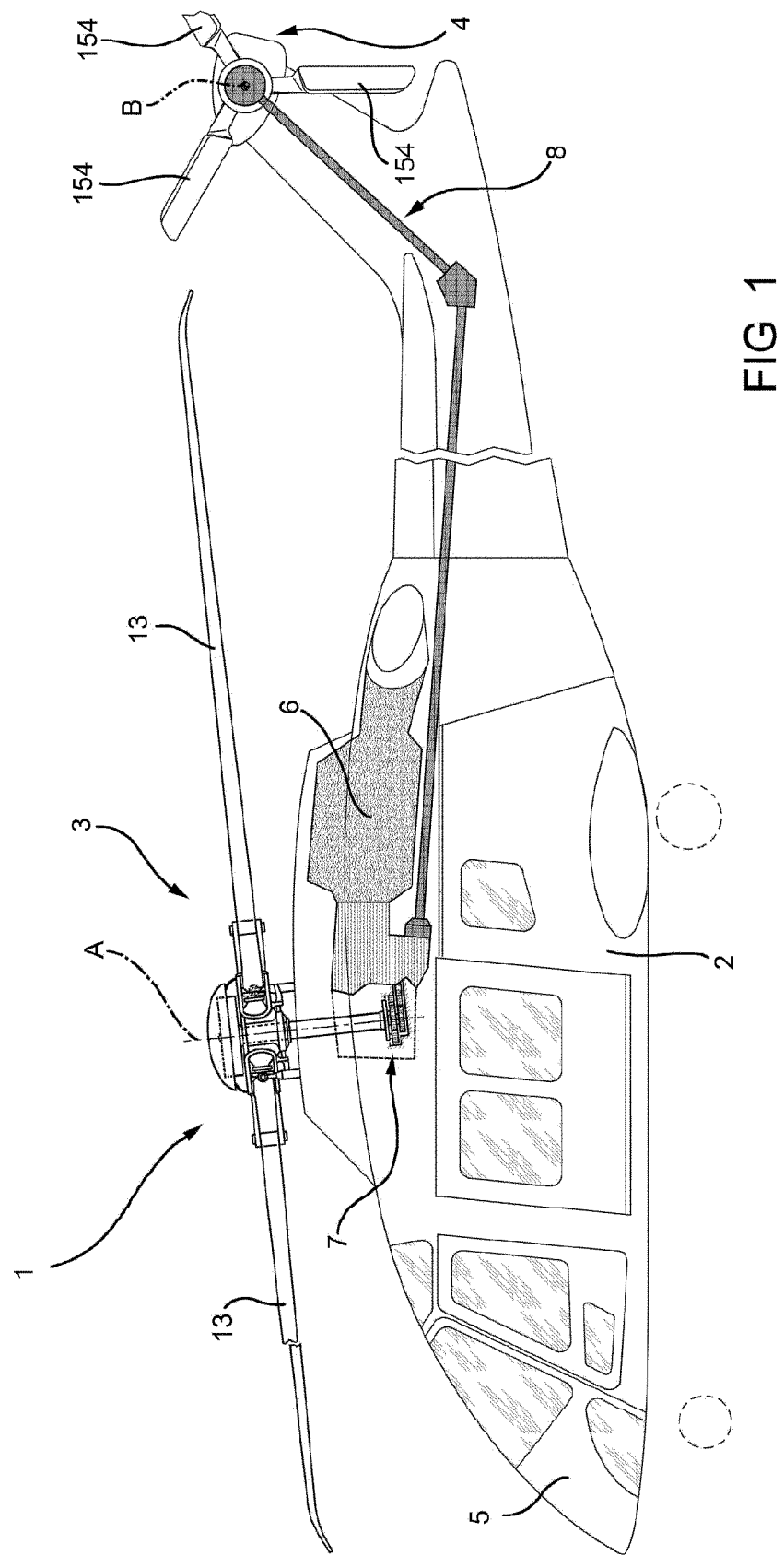
FIG. 1 is a schematic view of a helicopter comprising a main and a tail rotor in accordance to the present invention.

With reference to FIG. 1, numeral 1 indicates an aircraft capable of hovering, in particular a helicopter.

Helicopter 1 essentially comprises (FIG. 1) a fuselage 2 with a nose 5; a main rotor 3 fitted to the top of fuselage 2 and rotatable about an axis A; and an anti-torque tail rotor 4 fitted to a fin projecting from fuselage 2 at the opposite end to nose 5 and rotatable about an axis B transversal to axis A.

More specifically, main rotor 3 provides helicopter 1 with the lift to raise it, and the thrust to move it forward, while rotor 4 exerts force on the fin to generate a straightening torque on fuselage 2. The straightening torque balances the torque exerted on fuselage 2 by main rotor 3, and which would otherwise rotate fuselage 2 about axis A.

Helicopter 1 also comprises:
  a pair of turbines 6 (only one of which is shown);
  a main transmission group 7, which transmits the motion from turbine 6; and an additional transmission group 8, which transmits the motion from main transmission group 7 to tail rotor 4.

Figure 2:
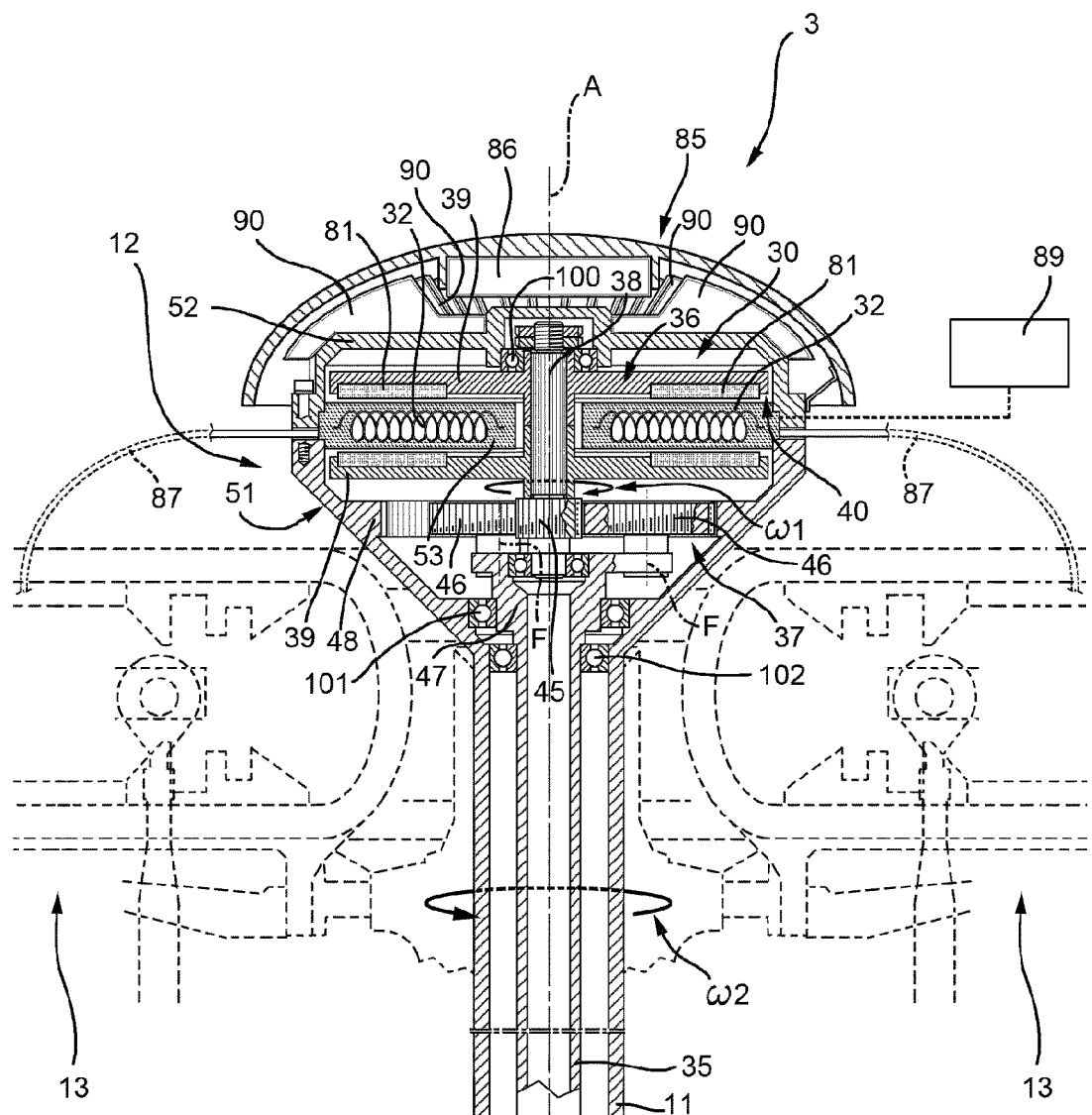
FIG. 2 is a transversal section of the main rotor of FIG. 1 in accordance to a first embodiment of the present invention.

With reference to FIG. 2, rotor 3 substantially comprises:
a stator 10, which is fixed to fuselage 2;
a mast 11, which is rotatable about an axis A with respect to stator 10;
a hub 12, which is rotationally integral to mast 11; and
a plurality of blades 13 (only two of which are shown in FIG. 2), which are articulated onto hub 12.

In the embodiment shown, stator 10 is stationary with respect to axis A. Furthermore, stator 10, mast 11 and hub 12 are hollow. Rotor 3 also comprises an epicyclic gear train 17, which transmits the motion from an end shaft (not shown) of main transmission group 7 to mast 11 and hub 12.

In detail, epicyclic gear train 17 is coaxial to axis A and comprises:
a sun gear 20 which is driven in rotation about axis A by the end shaft of main transmission group 7 and comprises a radially outer toothing;
a plurality of planetary gears 21 (only two shown in FIG. 2) which comprise, each, a radially inner toothing meshing with sun gear 20 and a radially outer toothing meshing with a radially inner toothing defined by stator 10; and
a carrier 22 which is rotationally integral with and connected to planetary gears 21 and to mast 11.

In particular, stator 10 acts as a stationary crown 23 of epicyclic gear train 17.

Planetary gears 21 rotate about relative axes E parallel to axis A and revolve about axis A.

Advantageously, rotor 3 comprises (FIGS. 2 and 3):
a support element 36, which supports a source 30 of magnetic field $B_S$ and is driven in rotation about axis A with a rotational speed ω1; and
an electric circuit 32, which is operatively connected to mast 11 and is driven in rotation at a rotational speed ω2 different from first rotational speed ω1; electric circuit 32 is electromagnetically coupled with said source 30, so that an electromotive force $emf_R$ is magnetically induced, in use, in electric circuit 32 and an electric current $i_R$ flow in electric circuit 32;
an electric circuit 65, which is arranged on stator 10; and
a sensor 58, which is adapted to detect a quantity associated to the back electromotive force $bemf_C$ induced on support element 36 and associated to current $i_R$ flowing on electric circuit 32.

In this way, source 30 and electric circuit 32 form an electric generator, which induces electromotive force $emf_R$ in mast 11 and, therefore, in hub 12 and blades 13, due to the differential rotational speed ω2−ω1.

In the embodiment shown, source 30 comprises a plurality of permanent magnets 81, which are fitted to support element 36 and angularly spaced with respect to axis A. Electromotive force $emf_R$ generates an electric current $i_R$ in electric circuit 32. Current $i_R$ generates a magnetic field Br which, in turn, induces, by Faraday's law back electromotive force $bemf_C$ on stator 10. In the embodiment shown, electric generator is an axial flux machine, in which the magnetic field generated by source 30 is mainly directed parallel to axis A.

Figure 3:
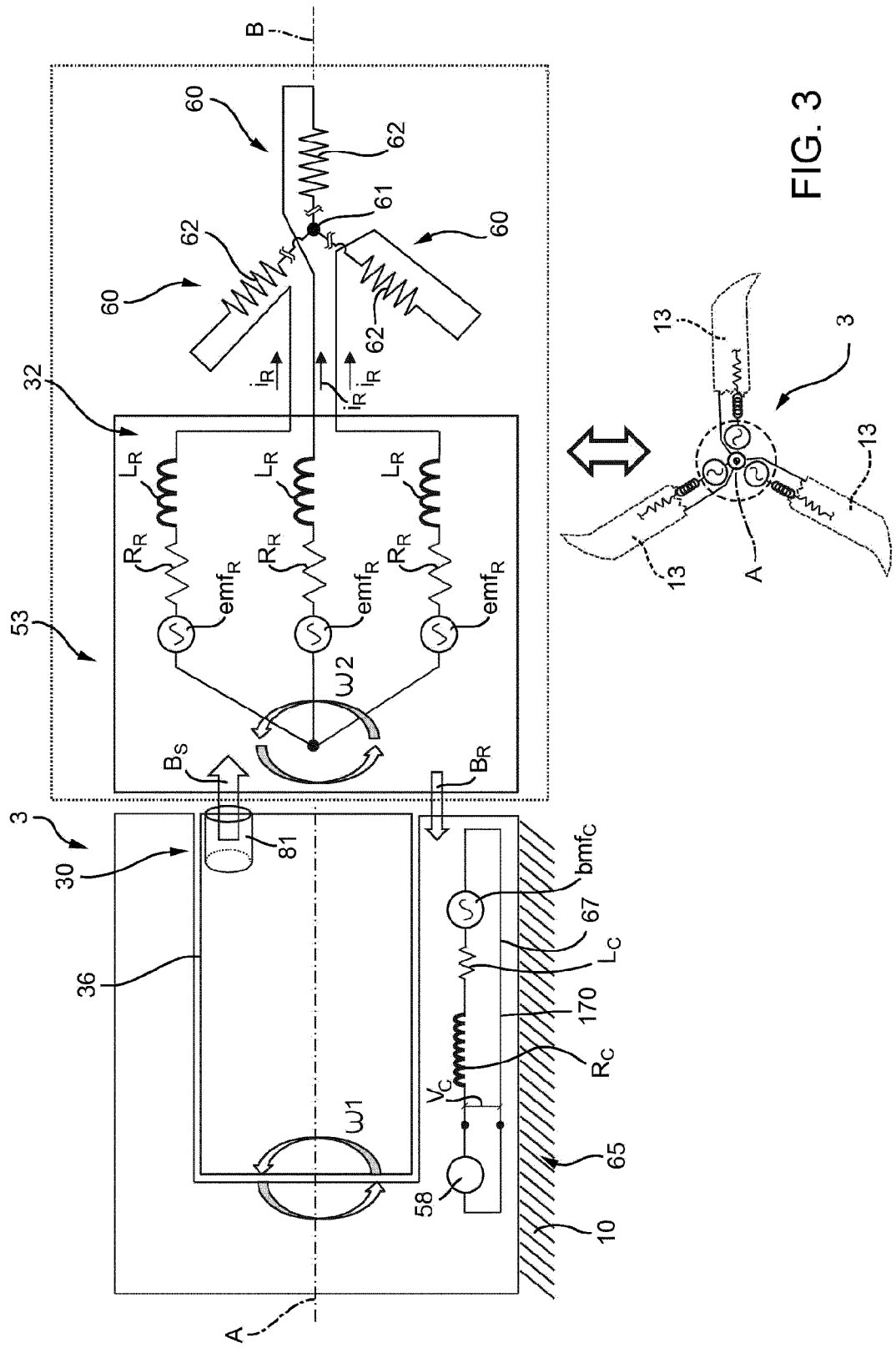
FIG. 3 is a schematic view of electric circuits of the rotor of FIG. 2.

Electric circuit 32 comprises (FIG. 3) a plurality of branches 60 (three in the embodiment shown), which extend partially inside respective blades 13 and are electrically connected to one another in a common knot 61. Each branch 60 comprises a resistive load 62, which is arranged on relative blade 13. The electric current flowing in branches 60 is indicated in FIG. 3 as $i_R$. Loads 62 can be determined by an electric circuit embedded inside blades 13 themselves and fed with electric current $i_R$. This electric circuit operates as an anti-icing system or a de-icing system. In another embodiment, loads 62 can be determined by respective actuators, which are fed with electric current $i_R$.

Figure 11:
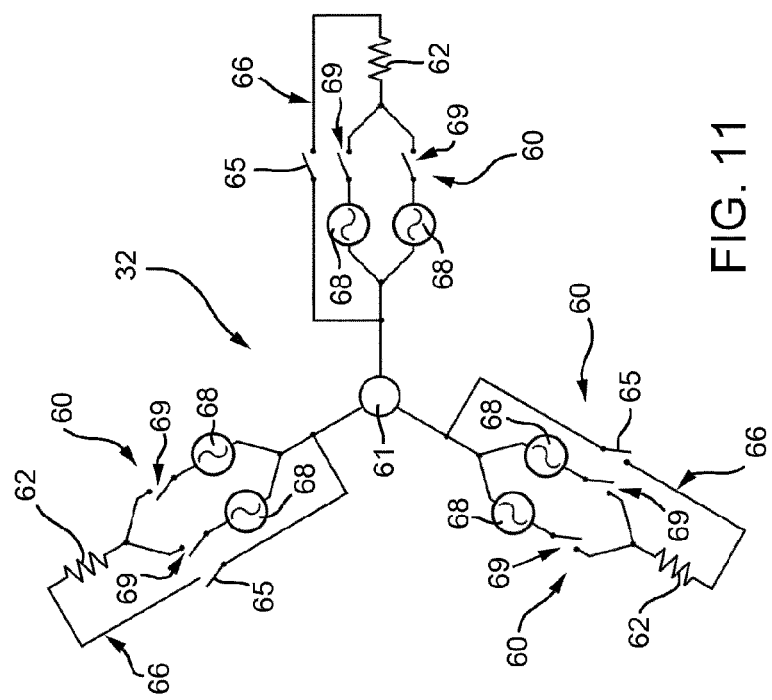
FIGS. 10 and 11 show, in enlarged view, some components of further electric circuits of the rotors of FIGS. 2 and 8, with parts removed for clarity.
Figure 10:
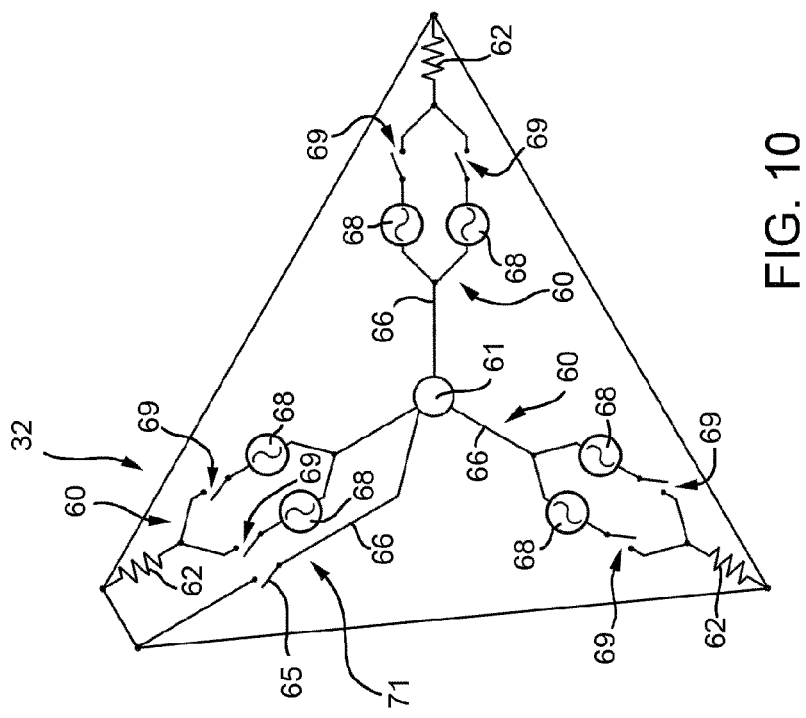

With reference to FIGS. 10 and 11, electric circuit 32 comprises, for each branch 60, a plurality, two in the embodiment shown, of windings 68 and respective switches 69. Windings 68 and switches 69 of each branch 60 are interposed between knot 61 and relative load 62. Each branch 60 of electric circuit 32 also comprise, in one embodiment shown in FIG. 11, a return portion 66, which extends from relative load 62 and knot 61 and is arranged on the opposite side of load 62 with respect to windings 68. Branch 60 also comprises a switch 65 arranged on relative portion 66. Alternatively, electric circuit 32 comprises only a return portion 71 common to all branches 60, which electrically connects all loads 62 to knot 61 and along which switch 66 is interposed (FIG. 10).

Thus, a certain degree of redundancy is ensured, in case of fault of one of windings 68 or short-circuits of some of windings 68. Switches 65, 69 and portion 71 are not shown in FIGS. 3 and 5 to 7.

Each branch 60 has an equivalent resistance $R_R$ and inductance $L_R$ which in FIG. 3 is modelled with a resistor and inductor respectively. Furthermore, in FIG. 3, the electromotive forces $emf_R$ acting on respective branches 60 are modelled with an alternate voltage generator. Each branch 60 also comprises a portion 87 (FIG. 2) which extends between hub 12 and relative blade 13. Source 30 comprises a plurality of angularly spaced permanent magnets 81 (only one of which is shown in FIG. 2), which generate a magnetic field $B_{Ss}$, parallel to axis A.

Electric circuit 65 is, in the embodiment shown, an open coil 67, which is electromagnetically coupled with electric circuit 32. Electric circuit 65 has an equivalent electric resistance $R_C$ and an inductance $L_C$, which in FIG. 3 are modelled with a resistor and inductor respectively. Furthermore, in FIG. 3, back electromotive force $bemf_C$ acting on electric circuit 65 is modelled with an alternate voltage generator. Sensor is a voltage sensor and is configured to detect voltage $V_C$ across electric circuit 65 and to generate a signal associated to voltage $V_C$.

Rotor 3 further comprises, an electric circuit 80 (only schematically shown in FIG. 8), which receives in input the signal generated by sensor 58 and outputs peak value $V_{Cmax}$ of voltage $V_C$ and, therefore, of back electro-motive force $befm_C$. Peak value $V_{Cmax}$ of voltage $V_C$ is associated to peak value of current $i_R$ flowing inside loads 62. In particular, on the basis of peak value $V_{Cmax}$ of voltage $V_C$ and, therefore, of the peak value of current $i_R$, it is possible to recognize the following operative configurations of electric circuit 32:
peak value of current $i_R$ is null; this condition corresponds to the fact that loads 62 are not electrically fed and, e.g., the anti-icing system is not operative;
peak value of current $i_R$ is lower than the maximum value; this condition corresponds to the fault of one or some of windings 68; and
peak value current $i_R$ is higher than the maximum value; this condition corresponds to the short-circuit of windings 68 electrically connected to same load 62.

Rotor 3 further comprises a control unit 200 (FIG. 8), which receives peak value $V_{Cmax}$ of voltage $V_C$ from electrical circuit 80 and is configured to accordingly controls switches 65, 69 or generate a warning signal. For example, in case of short-circuit of windings 68 connected to same load 62, control unit 200 is programmed to set relative switch 65 in the open position. In case of fault of one windings 68 connected to a load 62, control unit 200 is programmed to set relative switch 68 in the open position. In case of fault of load 62, control unit 200 generates a warning alarm for the pilot.

Rotor 3 further comprises:
- a shaft 35, which is elongated parallel to axis A and is fixed to stator 10;
- support element 36; and
- an epicyclic gear train 37.

Support element 36 comprises:
- a shaft 38 elongated about axis A;
- a pair of disks 39 protruding from shaft 38 orthogonally to axis A.

Disks 39 comprise respective faces 40 which face with one another along axis A and to which permanent magnets 81 are fitted.

Epicyclic gear train 37 substantially comprises:
- a radially outer toothing defined by an axially end gear 45 of shaft 38, which is arranged on the axial side of stator 10;
- a plurality of planetary gears 46, which extend about respective axes F parallel to and staggered from axis A and have, each, a radially outer toothing with respect to relative axis F meshing with radially outer toothing of end gear 45;
- a carrier 47, which is rotationally integral and connected to planetary gears 46 on one axial side and is connected to shaft 35 on the other axial side; and
- an annular ring 48, which connected to and rotationally integral with hub 12 and which comprises a radially inner toothing with respect to axis A meshing with radially outer toothing of planetary gears 46.

Planetary gears 46 rotate about respective axes F revolute about axis A.

Hub 12 comprises:
- a main tubular body 51; and
- a pair of rings 52, 53 which extend from body 51 towards axis A and orthogonally to axis A.

Ring 52 bounds hub 12 on the axial side of stator 10. Ring 53 is axially interposed between rings 52, 48. Furthermore, ring 48 extends from body 51 towards axis A and orthogonally to axis A. Ring 53 supports electric circuit 32. Ring 52 is axially interposed between disks 39 of support element 26. Rings 52, 53 surround shaft 38 and shaft 35 respectively with the interposition of a radial gap.

It is therefore possible to identify three assemblies inside rotor 3, which have relative rotational speed about axis A:
- stator 10 and shaft 35, which are stationary about axis A;
- support element 36 and source 30, which rotate with rotational speed $\omega 1$ in a first direction about axis A; and
- mast 11, hub 12 with electric circuit 32, which rotate with rotational speed $\omega 2$ in a second direction, opposite to first direction, about axis A.

Rotor 3 also comprises a hollow flow deflector 85 which is connected to an axial end of hub 12 and is rotationally integral with hub 12. Flow deflector 85 bounds rotor 3 on the opposite axial side of stator 10. Flow deflector 85 houses one disk 39, a top axial end of shaft 38 opposite to shaft 46, and disk 52. Furthermore, flow deflector 85 houses an electronic control unit 86 for controlling permanent magnets 81 and electric circuit 32. Preferably, flow deflector 85 is provided with an electric power storage device 89, which is charged by the electric current flowing inside electric conductive element 32. Flow deflector 85 is made of metal and comprises a plurality of thermally conductive rings 90 which are connected to ring 53.

Rotor 3 further comprises, with respect to axis A,:
- a bearing 100, which is radially interposed between shaft 38 and hub 12, with respect to axis A; and
- a pair of axially spaced bearings 101 which are radially interposed between shaft 35 and mast 11 and hub 12, with respect to axis A.

In use, the end shaft of main transmission group 7 drives in rotation sun gear 20 of epicyclic gear train 17 about axis A. Accordingly, also planetary gear 21 and carrier 22 rotate about axis A, thus driving in rotation mast 11, hub 12 and blades 13 about same axis A. Blades 13 are driven in rotation by hub 12 about axis A and can move with respect to hub 12 in a known manner. Hub 12, ring 48 and therefore electric conductive element 32 rotate about axis with rotational speed $\omega 2$ about axis A. In the meanwhile, epicyclic gear train 37 receives the motion from ring 48 rotating with rotational speed $\omega 2$ about axis A and drives in rotation support element 36, therefore, source 30 and permanent magnets 81 with a rotational speed $\omega 1$ about axis A. In particular, ring 48 integral with hub 12 meshes with planetary gears 46 stationary about axis A, and planetary gears 46 mesh with gear 45 rotationally integral with support element 36 and source 30. As a result, source 30 rotates with a rotational speed $\omega 1$, electric circuit 32 rotates with a rotational speed $\omega 2$ different from rotational speed $\omega 1$, and source 30 and conductive element 32 face with one another along axis A. Thus, magnetic field $B_S$ is generated by source 30 and electromotive force $emf_R$ is magnetically induced, by means of Faraday's law, in branches 60 rotating integrally with hub 12. Electromotive forces $emf_R$ cause the flowing of electric currents $i_R$ in branches 60 and loads 62. In particular, when switches 65, 69 are closed, electrical current $i_R$ flow inside relative windings 68 and electrically feed loads 62. Current $i_R$ is used for several purposes. For example, it can be used for feeding electric circuits inside blades 13 and providing de-icing or anti-icing function. Alternatively or in combination, the electromotive force can be used for operating the actuators fitted to blades 13. Being currents $i_R$ variable in the time, they generate a magnetic field $B_R$, which is variable in time. Time-variable magnetic field $B_R$ induces, by means of Faraday's law, a back electro-motive force $bemf_C$ on electric circuit 65.

Sensor 58 senses voltage $V_C$ across electric circuit 65. Being voltage $V_C$ generated by an alternate current, the signal generated by sensor 58 has a characteristic profile (an example of which is shown in FIG. 9), which is modulated by electric current $i_R$. In particular, the amplitude and the frequency of current $i_R$ and voltage $V_C$ depend with rotational speed $\omega 2$ of mast 11 and hub 12. For a given load 62 and rotational speed $\omega 2$, the signal is proportional to current $i_R$ and periodic with a frequency depending on rotational speed $\omega 2$ of mast 11 and hub 12. Thus, the signal contain useful information on the operation of loads 62. Preferably, electric circuit 80 receives in input the signal generated by sensor 58 and outputs peak value $V_{Cmax}$ of voltage $V_C$ and, therefore, of back electro-motive force $befm_C$. Peak value $V_{Cmax}$ of voltage $V_C$ is proportional to peak value of current $i_R$ flowing inside loads 62. In particular, on the basis of peak of value $V_{Cmax}$ of voltage $V_C$ and, therefore, of current $i_R$, it is possible to recognize the following operative configuration of electric circuit 32 and of loads 62:
- peak value of current $i_R$ is null; this condition corresponds to the fact that loads 62 are not electrically fed and, e.g., the anti-icing system is not operative; and
- peak value of current $i_R$ is lower than the maximum value; this condition corresponds to the fault of one or some of windings 68; and peak value current $i_R$ is higher than the maximum value; this condition corresponds to the short-circuit of some of windings 68.

Figure 4:
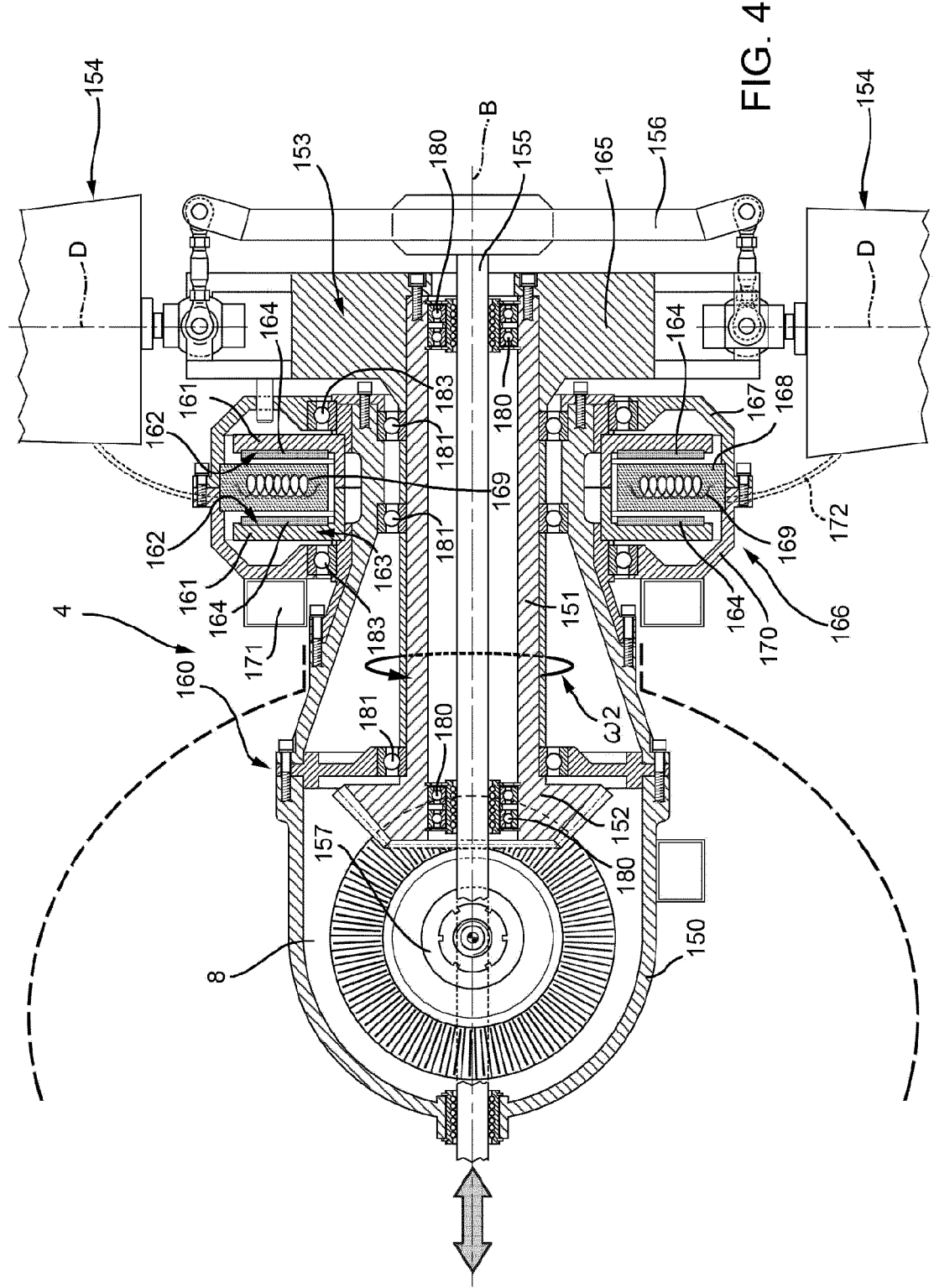
FIG. 4 is a transversal section of the tail rotor of FIG. 2 in accordance to a second embodiment of the present invention.
Figure 5:
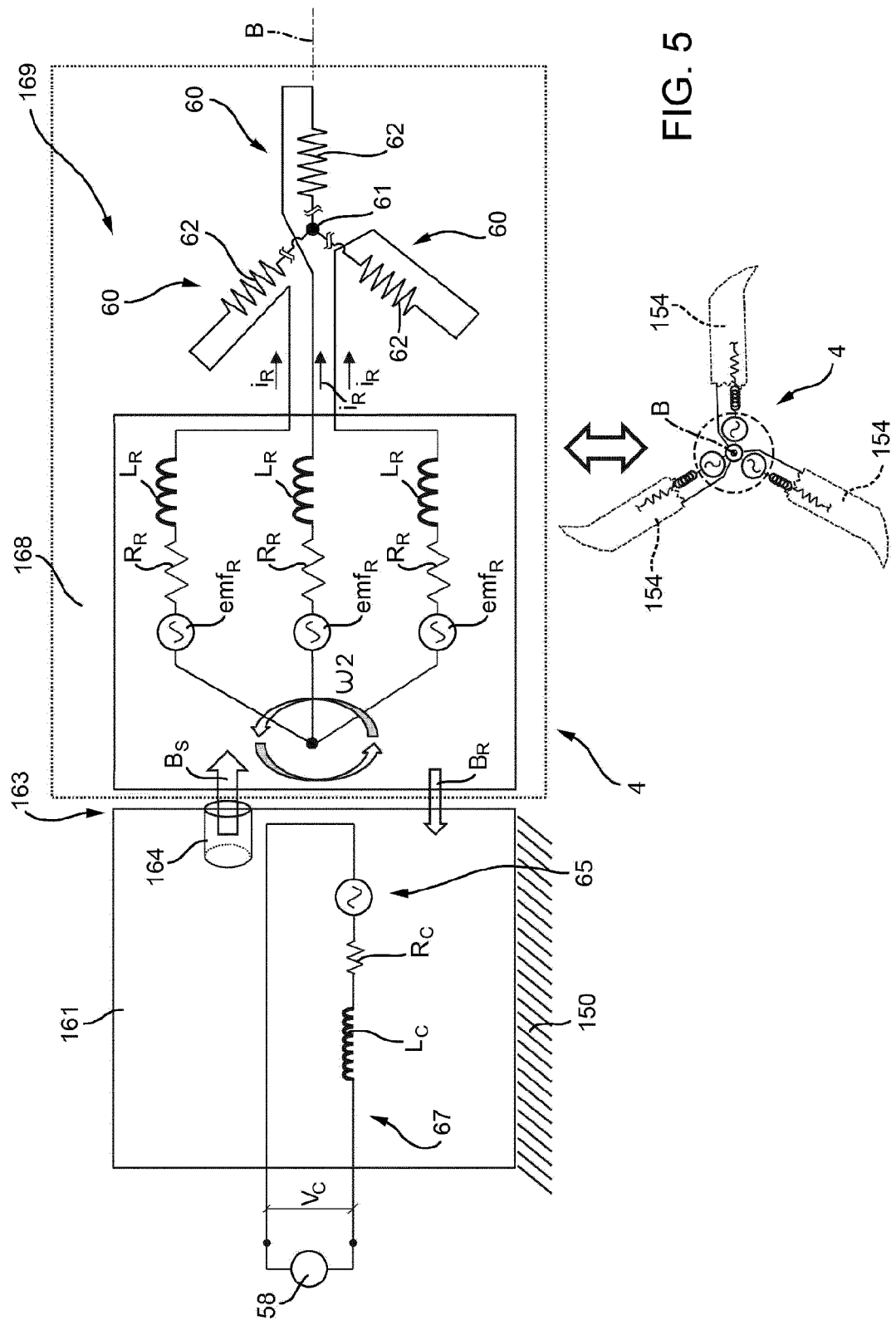
FIG. 5 is a schematic view of an electric circuit of the rotor of FIG. 4.

With reference to FIGS. 4 and 5, reference number indicates, as a whole, an anti-torque tail rotor according to a second embodiment of the present invention.

Rotor 4 is similar to rotor 3 and will be described hereinafter only as far as it differs therefrom; corresponding or equivalent parts of rotors 4, 3 will be indicated where possible by the same reference numbers.

In particular, rotor 4 substantially comprises (FIG. 4):
a hollow housing 150 which is fitted to fuselage 2;
a hollow mast 151, which rotatable about an axis B transversal to axis A with a rotation speed ω2 and is connected to an end shaft 157 of additional transmission group 8 by means of a bevel gear 152 arranged at an axial end of mast 151;
a hub 153 which is rotationally integral with and connected to mast 151; and
a plurality of blades 154 (only two of which are shown in FIG. 4), which are articulated onto hub 153 and extend along respective longitudinal axes D.

Bevel gear 152 and mast 151 are contained inside housing 150. Hub 153 and blades 154 extend outside housing 150.

Rotor 4 also comprises a control rod 155, which extends along axis B and is slidable along axis B with respect to mast 151. Control rod 155 comprises an axial end on the opposite side of gear 152 which is fixed to lever 156. Lever 156 extends transversally to axis B and is connected to blades 154 eccentrically to relative axes D. In this way, the movement of rod 155 along axis B causes the rotation of blades 154 along relative axes D and the adjustment of relative pitch angles.

In greater detail, housing 150 comprises:
a main body 160 elongated along axis B; and
a pair of annular disks 161, which radially protrude from body 160 on the opposite side of axis B and lie on relative planes orthogonal to axis B.

Disks 161 comprise relative surface 162, which axially face with one another and to which respective permanent magnets 164 are fitted. Permanent magnets 164 generate magnetic field Bs parallel to axis B.

Hub 153 comprises:
a body 165, which is connected to mast 151, is arranged in front of an axial end of housing 150 on the axial opposite side with respect to bevel gear 152; and
a body 166, which is connected to body 165 and surrounds an open axial end of housing 150 opposite to bevel gear 152.

In greater detail, blades 154 are articulated onto body 165. Body 166 comprises, proceeding along axis B from body 165 towards bevel gear 152:
an annular ring 167 connected to body 165;
an annular ring 168 onto which an electric circuit 169 is fixed; and
an annular ring 170 onto which an electronic control unit 171 for controlling electric circuit 169 is fitted.

Ring 168 is axially interposed between disks 161.

Electric circuit 169 is axially interposed between permanent magnets 164.

In this way, electric circuit 169 rotating at rotational speed ω2 is magnetically coupled with source 163 of magnetic field Bs rotating at rotational speed ω1=0, i.e. stationary about axis B. Accordingly, permanent magnets 164 and electric circuit 169 form an electric generator, which induces by Faraday's law an electromotive force $emf_R$ in mast 151 and, therefore, in hub 152 and blades 154, due to the differential rotational speed ω2−ω1=ω2. Electric circuit 169 is electrically connected to blades 154 by means of electric wires 172. In this way, electric current $i_R$ is available to blades 154.

Finally, rotor 4 comprises, with respect to axis B, :
a plurality of bearings 180 radially interposed between control rod 155 and mast 152;
bearings 181 radially interposed between mast 152 and a radially inner surface of housing 150; and
bearings 183 radially interposed between a radially outer surface of housing 150 and relative disks 167, 170.

The operation of rotor 4 is similar to rotor 3 and is described only insofar as it differs from that of rotor 3.

In particular, end shaft 157 of additional transmission group 8 drives in rotation bevel gear 152 about axis B at rotational speed ω2. Accordingly, also hub 152 and blades 154 and electric circuit 169 are driven in rotation about axis B with rotational speed ω2. Blades 154 are driven in rotation by hub 152 about axis B and can move with respect to hub 152 in a known manner. Furthermore, the pitch angles with respect to relative axes D of blades 154 can be adjusted by sliding movement of control rod 155 along axis B.

Source 163 and permanent magnets 164 are fitted to housing 150 and is stationary about axis B, i.e. source 163 and permanent magnets 164 can be seen as rotating with a rotational speed ω1=0 about axis B. Permanent magnets 164 generate magnetic field $B_s$. Thanks to the different rotational speed between electric circuit 169 and source 163, electromotive force $emf_R$ is magnetically induced, by means of Faraday's law, in electric circuit 169 rotating integrally with hub 152.

With reference to FIG. 5, being electric currents $i_R$ variable in the time, they generate a magnetic field $B_R$, which is variable in time.

Time-variable magnetic field $B_R$ induces, by means of Faraday's law, a back electro-motive force $bemf_C$ on electric circuit 65.

Sensor 58 senses voltage $V_C$ across electric circuit 65.

Figure 6:
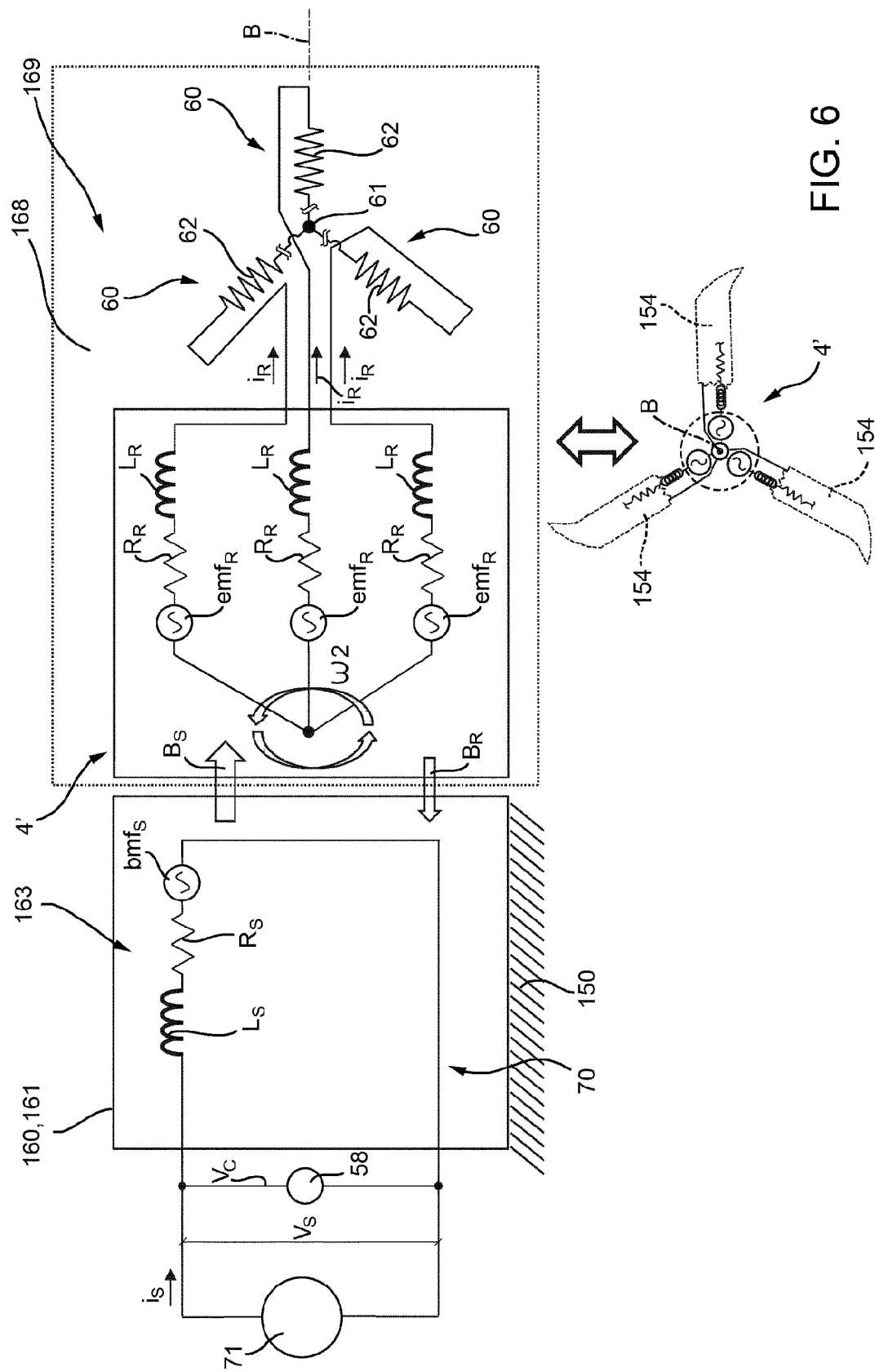
FIG. 6 is schematic view of an electric circuit of a tail rotor in accordance to a third embodiment of the present invention.

With reference to FIG. 6, 4' indicates, as a whole, a tail rotor according to a third embodiment of the present invention.

Rotor 4' is similar to rotor 4 and will be described hereinafter only as far as it differs therefrom; corresponding or equivalent parts of rotors 4, 4' will be indicated where possible by the same reference numbers.

In particular, rotor 4' differs for rotor 4 in that source 163 comprises, instead of spaced permanent magnets 164, an electric circuit 70 which generates magnetic field $B_S$ directed along axis B. Electric circuit 70 is electromagnetically coupled with electric circuit 169. Electric circuit 70 comprises a voltage generator 71 generating a voltage $V_S$ and has an equivalent electric resistance $R_S$ and an inductance $L_S$, which in FIG. 6 are modelled with a resistor and inductor respectively. Voltage generator 71 causes the flow of an electric current $i_S$ inside electric circuit 70. Electric current $i_S$ generates, in turn, magnetic field $B_S$. Preferably, voltage generator 71 is a direct voltage generator. Furthermore, in FIG. 6, back electromotive force $bemf_S$ acting on electric circuit 70 is modelled with an alternate voltage generator.

Sensor is a voltage sensor and is configured to detect voltage $V_C$ across electric circuit 70.

The operation of rotor 4' is similar to rotor 4 and is described only insofar as it differs from that of rotor 4. In particular, the operation of rotor 4' differs from rotor 4 in that magnetic field $B_S$ is generated by electric circuit 70 of housing 150 and in that back electromotor force $bemf_S$ is induced by magnetic field Br on electric circuit 70.

Figure 7:
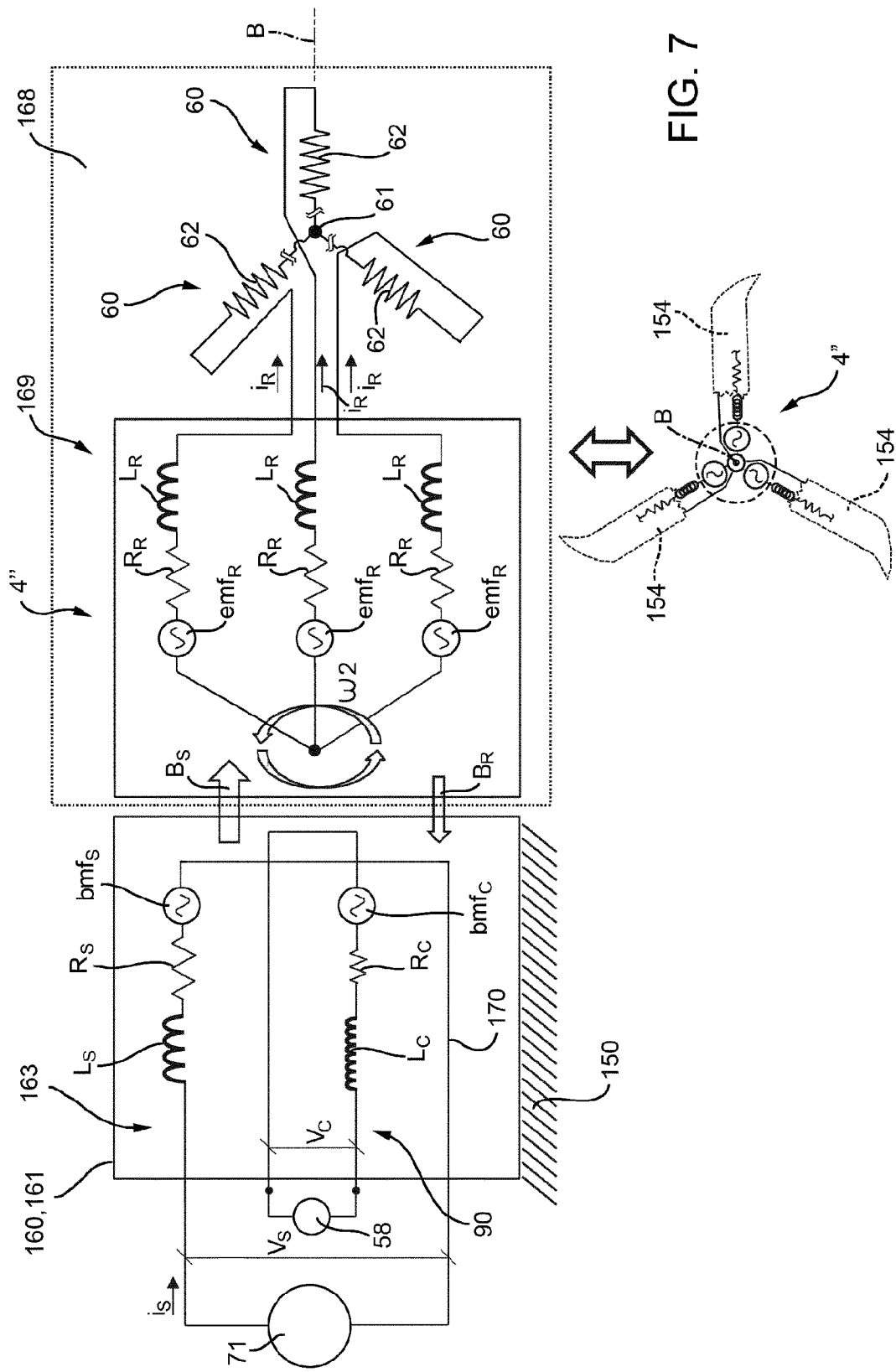
FIG. 7 is a schematic view an electric circuit of a tail rotor in accordance to a fourth embodiment of the present invention.

With reference to FIG. 7, 4" indicates, as a whole, a tail rotor according to a fourth embodiment of the present invention. Rotor 4" is similar to rotor 4 and will be described hereinafter only as far as it differs therefrom; corresponding or equivalent parts of rotors 4, 4" will be indicated where possible by the same reference numbers. In particular, rotor 4" differs for rotor 4' for comprising, in addition to electric circuit 70, an electric circuit 90. Electric circuit 90 is electromagnetically coupled with electric circuit 169. Electric circuit 90 is, in the embodiment shown, an open coil 170, which is electromagnetically coupled with electric circuit 169. Electric circuit 90 has an equivalent electric resistance $R_C$ and an inductance $L_C$, which in FIG. 7 are modelled with a resistor and inductor respectively. Furthermore, in FIG. 6, back electromotive force $Bemf_C$ acting on coil 170 is modelled with an alternate voltage generator. Sensor 58 is a voltage sensor and is configured to detect the voltage $V_C$ across electric circuit 90.

The operation of rotor 4" is similar to rotor 4 and is described only insofar as it differs from that of rotor 4. In particular, the operation of rotor 4" differs from the one of rotor 4 in that back electromotor force $bemf_C$ is induced by magnetic field $B_R$ on electric circuit 90.

The advantages of rotor 3, 4, 4', 4" and the method according to the present invention will be clear from the foregoing description.

In particular, rotor 3, 4, 4', 4" comprises sensor 58, which generates a signal associated to the back electromotive force $bemf_C$, $bemf_S$ induced on electric circuit 65, 70, 90 by variable current $i_R$ flowing inside electric circuit 32.

This signal allows to recognize some features of the temporal variation of $i_R$, which are associated to several operative configurations of loads 62 and windings 68.

In particular,:
- in case electrical current $i_R$ is null, loads 62 are not electrically fed and, e.g., the anti-icing system is not operative;
- in case electrical current $i_R$ is lower than the maximum value, there is a fault in one or some of windings 68; and
- in case peak value of electrical current $i_R$ is higher than the maximum value, there is a short-circuit of windings 68 electrically connected to same load 62.

It is therefore possible recognize potentially dangerous for rotor 3, 4, 4', 4", as for example the fact that the anti-icing system is not operative or the presence of short-circuits of windings 68 which could lead to an excess in the torque acting on mast 11 and hub 12.

Furthermore (FIGS. 10 and 11), switches 69 interposed between each load 62 and relative windings 68 allow to exclude one of windings 68 in case of not proper operation thereof.

Switches 65 interposed between knot 61 and relative load 62 allow to exclude both relative windings 68 in case of short-circuit thereof. Thus, the signal generated by sensor 58 provides highly relevant information on the operative status of loads 62 and therefore of corresponding accessory components, without requiring any physical connection between support element 36 or housing 150 and hub 11. This information can be provided inside fuselage 2.

As regards to rotor 3 shown in FIGS. 3 and 4, electric circuit 65 is fitted to stator 10. Thus, even if permanent magnets 81 are angularly integral with support element 36 rotating at rotational speed ω1, the signal provided by sensor 58 is available at stator 10 and, therefore, at fuselage 2 of helicopter 1. Accordingly, rotor 3 allows to increase the differential rotational speed ω2−ω1 between electrical conductive element 32 and source 30 of magnetic field, with a reduced axial size. Thus, support element 32 and hub 12, can be made smaller and more weight efficient, because the higher the differential rotational speed ω2−ω1, the lower is the torque required for a given value of the electromotive force induced in electric conductive element 32. The less the torque, the smaller the diameter and, therefore, the weight of support element 32 and hub 12, with evident advantages on the payload. This is particularly advantageous, when rotational speed ω2 of hub 12 is necessarily slow as in main rotor 3.

Furthermore, the electric generator formed by source 30, 163 and electric circuit 32, 169 as well as electric circuit 65, 70, 90 and sensor 58 has a contained axial size and can be, therefore, easily integrated in the customary size of rotor 3, 4, 4', 4", without requiring any re-designing thereof.

For the same reasons, the electric generator formed by source 30, 163 and electric conductive element 32, 169 can be easily retrofitted inside an already existing rotor 3, 4, 4', 4".

Clearly, changes may be made to rotor 3, 4, 4', 4" and the method according to the present invention without, however, departing from the scope as defined in the accompanying Claims.

In particular, the electric generator formed by source 30, 163 and electric circuit 32, 169 could be a radial flux machine, in which the magnetic field generated by source 30, 163 is mainly directed radially axis A, B.

Furthermore, electric circuit 65 of rotor 3 could be arranged on support element 36 and rotate with rotational speed ω1 about axis A.

Source 30 of magnetic field $B_S$ in rotor 3 could be, instead of permanent magnets 81, an electric circuit similar to electrical circuit 70 of rotor 4' and arranged on support element 36.

Rotor 3, 4, 4', 4" could comprise, instead of mechanical main and additionally transmission group 7, 8, an electrical motor for driving rotor 3, 4, 4', 4". In this case, rotor 3, 4', 4", 4''' would comprise a stator to which source 30, 163 would be fitted and a rotor to which electrical circuit 32, 169 would be fitted.

Aircraft 1 could be a convertiplane instead of a helicopter.

Aircraft 1 could comprise rotor 3, 4', 4", 4''' in accordance with the invention and a conventional anti-torque tail rotor, or a conventional main rotor and anti-torque tail rotor 4 in accordance with the invention.

The invention claimed is:

1. A rotor (3, 4, 4', 4") for an aircraft (1) capable of hovering, comprising:
   a stator (10, 150);
   a rotatable element (11, 151), which is rotatable about an axis (A, B) with respect to said stator (10, 150);
   at least one blade (13; 154), which is operatively connected with said element (11, 151);
   characterized by comprising:
   a support element (36; 160, 161), which supports a source (30) of magnetic field (BS), and is configured to operate in a stationary state and a driven state, in use, in rotation at a first rotational speed (ω1); and
   a first electric circuit (32, 169), which is angularly integral with said element (11, 151) and can be driven, in use, in rotation at a second rotational speed (ω2) different from said first rotational speed (ω1);
   said first electric circuit (32, 169) being electromagnetically coupled with said source (30, 163), so that an electromotive force ($emf_R$) is magnetically induced, in use, in said first electric circuit (32, 169) itself and a first electric current ($i_R$) flows, in use, in said first electric circuit (32, 169);

said rotor (3, 4, 4', 4") further comprising:
- a second electric circuit (65; 65; 70; 90) which is configured to operate in a stationary state and a driven state, in use, in rotation at the first rotational speed ($\omega 1$); and
- a sensor (58) configured to generate a signal ($V_C$) associated to the value of a back electromotive force ($bemf_C$, $bemf_S$) induced on said second electric circuit (65; 70; 90) and associated to said electric current ($i_R$) flowing inside said first electric circuit (32).

2. The rotor of claim 1, wherein said second electric circuit (70) defines said source (30);
said second electric circuit (70) comprising a voltage generator (71);
said rotor being configured such that, in use, said back electromotive force ($bemf_S$) is induced onto said second electric circuit (70);
said sensor (58) being adapted to detect the voltage ($V_C$) across said second electric circuit (70).

3. The rotor of claim 2, wherein said voltage generator (71) is a direct voltage generator.

4. The rotor of claim 1, wherein said source (30, 163) is distinct from said second electric circuit (65, 90).

5. The rotor of claim 4, wherein said source (30) is fitted to said support element (36), and said second electric circuit (65, 90) is fitted to said stator (10);
said support element (36) being rotatable with said first rotational speed ($\omega 1$) about said axis (A).

6. The rotor of claim 4, wherein said second electric circuit (65, 90) is an open coil (67, 170) across which said sensor (58) is fitted.

7. The rotor of claim 1, wherein said sensor (58) is a voltage sensor.

8. The rotor of claim 1, further comprising a third electric circuit (80), that is configured such that, in use, said third electric circuit (80) is fed with said signal ($V_c$) from said sensor (58) and said third electric circuit being configured to output, in use, a quantity associated ($V_{cmax}$) to peak value of said back electromotive force ($bemf_C$, $bemf_S$).

9. The rotor of claim 1, wherein said at least one blade (13; 154) comprises a plurality of blades and wherein said first electric circuit (32, 169) comprises a plurality of branches (60) extending in part inside said plurality blades (13);
each said branch (60) comprising a relative electric load (62), which is arranged inside one blade of said plurality of blades.

10. The rotor of claim 9, wherein each said branch (60) comprises:
at least two windings (68) electrically connected to a single said relative electric load (62); and
at least two switches (65), which are interposed between relative said windings (68) and said single relative load (62).

11. The rotor of claim 9, wherein said first electric circuit (32, 169) comprises a knot (61) common to said branches (62) and at least one return portion (66);

said first electric circuit (32, 169) comprising a second switch (69), which is interposed along said return portion (66).

12. The rotor of claim 9, further comprising an anti-icing or a de-icing system for said relative blade (13, 164); said anti-icing or de-icing system comprising said load (62).

13. An aircraft (1) capable of hovering, comprising:
a fuselage (2); and
a main rotor (3) and an anti-torque tail rotor (4);
at least one of said main rotor (3) and sad anti-torque tail rotor (4, 4', 4") being according to claim 1.

14. A method of operating a rotor (3, 3') for an aircraft (1) capable of hovering; said rotor (3, 4, 4', 4") comprising:
a stator (10, 150);
a rotatable element (11, 151), which is rotatable about an axis (A, B) with respect to said stator (10, 150);
at least one blade (13, 154), which is operatively connected with said element (11, 151);
a source (30, 163) of a magnetic field ($B_S$) that is configured to operate in a stationary state and a driven state, in use, in rotation at a first rotational speed ($\omega 1$); wherein the method comprises the steps of:
either keeping the source (30, 163) of the magnetic field ($B_S$) stationary with respect to said axis (A, B) or driving it in rotation with the first rotational speed ($\omega 1$);
driving in rotation a first electric circuit (32, 169), which is angularly integral with said element (11, 151) with a second rotational speed ($\omega 2$) different from said first rotational speed ($\omega 1$);
electromagnetically coupling said first electric circuit (32, 169) with said source (30, 163), so that an electromotive force ($emf_R$) is magnetically induced, in use, in said first electric circuit (32, 169) and an electrical current ($i_R$) flows inside said electrical circuit (32, 169);
either keeping a second electric circuit (65; 70; 90) stationary about said axis (A, B) or driving it in rotation at the first rotational speed ($\omega 1$) about said axis (A, B); and
generating a signal ($V_c$) a quantity associated to a back electromotive force ($bemf_C$, $bemf_S$) induced on said second electric circuit (65; 70; 90) and associated to said electric current ($i_R$) flowing inside said first electric circuit (32, 169).

15. The method of claim 14, characterized by comprising the further steps of:
generating said magnetic field ($B_s$) by means of said second electric circuit (70);
generating a voltage ($V_S$) across said second electric circuit (70);
inducing said back electromotive force ($bemf_S$) being induced, in use, onto said second electric circuit (70); and
generating said signal ($V_c$) associated to a voltage ($V_C$) across said second electric circuit (70).

\* \* \* \* \*